United States Patent Office 3,428,584
Patented Feb. 18, 1969

3,428,584
FREEZE-DRIED MEMBRANE AND METHOD OF TREATING SAME
Robert L. Riley, San Diego, Calif., assignor, by mesne assignments, to Gulf General Atomic Incorporated, San Diego, Calif., a corporation of Delaware
No Drawing. Filed July 15, 1965, Ser. No. 472,304
U.S. Cl. 260—15                                    12 Claims
Int. Cl. C08b 21/16, 29/30

ABSTRACT OF THE DISCLOSURE

A process for making improved osmotic membranes from an organic solution of a cellulose derivative and a swelling agent by casting a tin layer followed by immersion in water. The solute-rejection capability of the osmotic membrane can be improved 40 percent or more by freeze-drying. The freeze-drying process also provides a dry osmotic membrane that can be stored indefinitely prior to rehydration. The cellulose derivative osmotic membrane can be made useful for separation of solutions containing organic solvents by rendering it insoluble thereto by means of cross-linking the cellulose. The formed osmotic membrane is treated with a suitable cross-linking agent either prior to or subsequent to a suitable drying process, the cross-linking either being performed simultaneously with the drying or subsequent thereto, as by heating.

---

This invention resulted from work done under Contract No. 14–01–0001–250 with the Office of Saline Water in the Department of the Interior, entered into pursuant to the Saline Water Act, 42 U.S.C. 1951–1958g.

This invention relates to the separation of solvent from a solution and more particularly to processes for improving the characteristics of porous semipermeable membranes having a chemical and physical nature such that they permit passage therethrough of a solvent at a much higher rate than they permit passage of a solute dissolved in the solvent. For purposes of this application, membranes which have these characteristics are hereinafter referred to as osmotic membranes.

Osmotic membranes of this general type, and processes for producing such membranes, are disclosed in U.S. Patents Nos. 3,133,132 and 3,133,137 issued to Loeb et al. These patents state that an osmotic membrane can be formed by dissolving a film-forming cellulosic ester, such as cellulose acetate, plus an aqueous solution of a salt, such as sodium or magnesium perchlorate, in an organic solvent, such as acetone, methyl ethyl ketone, ethyl alcohol, or methyl alcohol. A thin layer of this solution is cast on a flat surface to form a film of substantially uniform thickness, at a temperature below room temperature. A portion of the organic solvent is evaporated, also at a temperature below room temperature. The cast layer is then immersed in ice water to remove the salt and complete the set-up of the membrane. Preferably, the membrane is heated prior to its use to complete its osmotic organization.

In general, osmotic membranes of this general type when disposed with a solution, e.g., salt water, on one side of the membrane and the pure solvent, e.g., water, on the other side of the membrane, permit pure water to diffuse through the membrane to the salt water side. However, by applying a pressure greater than the osmotic pressure to the salt water, the flow through the membrane is reversed, and water which is substantially pure passes through the membrane from the salt water side to the pure water side. The rate of flow through the membrane is dependent upon various factors, such as the pressure and agitation applied to the salt water, the physical characteristics of the osmotic membrane, the chemical nature of the membrane, and the bulk concentration of the solute in the solution.

Osmotic membranes such as these are useful in the separation of the salt ions from sea water or other brackish or saline water and are also useful in various other separations of solvents from solutions. However, osmotic membranes formed in the above-described manner are usually stored in a wet condition because complete air-drying is considered harmful to the membrane, resulting in a reduction of the solute rejection capacity of the membrane. It is often inconvenient to store osmotic membranes in a wet condition; moreover, after prolonged periods of storage the rejection capability and/or the subsequent operational life of the membrane may be reduced. It is sometimes difficult to work with wet membranes in constructing separation apparatus. Processes for producing osmotic membranes which need not be stored wet are desired.

Osmotic membranes of the general type made from cellulosic esters, such as cellulose acetate, although effective in the separation of water from an aqueous salt solution, because of their chemical characteristics are inherently unsuitable for treatment of solutions of organic solvents, such as acetone, other ketones, or various alcohols. Moreover, osmotic membranes of this general type, which are often used in thicknesses of less than about 0.005 inch, have inhernt strength limitation. Processes for improving the chemical and physical properties of osmotic membranes are desired.

A principal object of the present invention is to provide an improved osmotic membrane and a process for producing such a membrane. Another object of the invention is to provide a process for treating an osmotic membrane to permit its storage for considerable lengths of time in a dry state without a resultant decrease in its capability to separate solvent from a solution. A further object of the invention is to provide an osmotic membrane having improved physical properties and a process for producing such a membrane. A still further object of the invention is to provide an osmotic membrane suitable for separation of organic solvents from solutions of solutes therein and to provide a process for producing such a membrane. These and other objects of the invention are more particularly set forth in the following detailed description of processes for producing improved osmotic membranes embodying various of the features of the invention.

Briefly, it has been found that an osmotic membrane which has been formed in a wet condition can be freeze-dried to remove substantially all of the water therefrom and then may be stored for indefinite periods without suffering any significant deterioration to its capability to separate a solvent from a solution. It has also been found that the freeze-drying process permits a membrane of the cellulosic ester type to be effectively cross-linked. The membrane may be treated with a cross-linking agent before or after the freeze-drying process. Actuation of the cross-linking agent causes it to react with the cellulosic ester. Cross-linking so alters the chemical properties of the cellulosic ester to render it insoluble in various organic solvents. The cross-linking results in no significant deterioration of the capability of the osmotic membrane to separate a solvent from a solution.

The osmotic membrane starting material for the present processes may be made in accordance with the teaching of the previously mentioned two U.S. patents. After casting, the membrane is immersed in water; and theoretically, the membrane can be stored for prolonged periods of time in a wet condition. In actuality, the membrane is subject to hydrolysis and perhaps also to biological attack which results in a reduction in rejection capability and its subsequent operational life.

In accordance with a process of the invention, the wet membrane is frozen in order to change the molecules of water to crystals of ice. Although it is preferred to freeze the membrane quickly so that the ice crystals which form are quite small, slower freezing processes may also be used. The membrane may be frozen by immersion in a liquified gas which is nonreactive with the membrane. Quick freezing is conveniently carried out in this manner. In general, any relatively inert gas may be used, such as nitrogen, argon or helium. Nonreactive hydrocarbons, such as isopentane, are likewise considered suitable.

If, instead of immersing the memrane in liquified gas, a cryostat is used, the cryostat is preferably precooled to minimize the time necessary to freeze the water associated with the membrane. The cryostat is preferably operated at about $-45°$ C., although higher temperatures may be employed. The membrane is held within the cryostat for a period of time sufficient to assure that all of the water has been frozen to ice crystals.

After freezing, the membrane is transferred while the water is in the frozen state to a cryostatic vacuum chamber. Although any suitable cryostatic vacuum chamber which is maintained at a temperature below $0°$ C. may be used, a chamber which has been precooled to about $-45°$ C. is preferably employed. This temperature is maintained throughout the next step. A vacuum is drawn upon this chamber and held for a sufficient period of time to remove substantially all of the water by sublimation of the ice crystals to water vapor. Preferably, at least about 99% of the water is removed, that is of the water exclusive of any water which may be chemically bound to the celulosic ester resin.

Times, temperatures, and amounts of vacuum such as are known in the art of freeze-drying are used to complete the removal of the water by sublimation. For example, at a temperature of about $-45°$ C. and a pressure of 0.1 mm. of mercury, a time period of about 16 hours is sufficient to complete the desired water removal. Obviously, other combinations of temperature, vacuum, and time may be used which will produce equivalent results. To assure complete removal of water, the temperature of the vacuum chamber may be raised to about $25°$ C. and pumping continued for about 1 hour.

After removal of the water, the membrane may be stored for an indefinite period at atmospheric pressure and exposure to the air without experiencing any significant deterioration in its capability to reject solute. Measurement of the physical characteristics of the membrane before and after freeze-drying shows that there is no change in the thickness of the membrane, within tolerances of about 1.0 micron.

When it is desired to ready the membrane for use in a separation process, it is simply immersed in water at ambient temperature and at atmospheric pressure. Although immersion for about 1 to 8 hours is considered sufficient to rehydrate the membrane, preferably it is immersed for about a day. The completion of the rehydration may be observed visibly. Measurement of the rejection capabilities of two sections of membrane from the same membrane sample, which has been heat-treated to organize the membrane structure, as hereinafter described, one of which was maintained wet and the other of which was freeze-dried and then immediately rehydrated, shows that the solute rejection capabilities of both are substantially equal. Moreover, measurement of further membrane sections which were freeze-dried and then stored in the air for substantial periods of time before hydration shows that these membrane sections exhibit no significant difference in solute rejection capabilities from the two sections referred to above.

The osmotic membrane produced in the manner taught by the above-mentioned U.S. patents may be heat-treated to complete the organization of the membrane structure and raise the percentage rejection of solute accomplished by the membrane to a higher value, although simultaneously reducing the unit flow of flux of solvent therethrough. Osmotic membranes may be heat-treated before freeze-drying. Freeze-drying does not undesirably affect the organization of the osmotic membrane accomplished by heat-treating which increases its rejection capability. Moreover, it is believed that the freeze-drying process alone substantially organizes the osmotic membrane structure in generally the same manner as does the heat-treating process. In this respect, a nonheat-treated membrane which has been freeze-dried and rehydrated exhibits a percentage rejection of solute substantially in excess of that exhibited by a nonheat-treated, nonfreeze-dried membrane and approximately that of a heat-treated membrane.

The freeze-drying process permits a cellulosic ester osmotic membrane to be readily stabilized via cross-linking to increase various of its physical and chemical properties. In this respect, the wet membrane may be treated with an organic cross-linking agent before the freeze-drying step, which agent is activated either simultaneously with or subsequent to the conclusion of the freeze-drying step to accomplish the cross-linking of the cellulosic ester. Treatment with the cross-linking agent may be carried out subsequent to the freeze-drying step, depending upon the particular cross-linking agent chosen.

Any suitable organic cross-linking agent may be employed which will cross-link the organic polymeric material from which the osmotic membrane is made without itself undergoing undesirable polymerization. For an osmotic membrane that is formed in a wet condition, a cross-linking agent is preferably employed which is soluble in water. To treat a cellulosic membrane, such as cellulose acetate, cellulose nitrate or ethyl cellulose, an organic cross-linking agent which will cross-link hydroxy groups of adjacent cellulose chains is employed. To treat other organic polymeric semipermeable membrane materials, as for example hydroxyl-containing polymers such as polyvinyl acetals, polyvinyl acetates, etc., appropriate cross-linking agents for the particular polymeric material are employed. Examples of cross-linking agents include, but are by no means limited to, dialdehydes, diisocyanates, phenolic resins, diepoxides, urea-formaldehyde resins, melamine-formaldehyde resins and polybasic acids. Certain substances sold commercially as cationic wet strength resins also cross-link satisfactorily, but by a different process.

The method of application of the cross-linking agent to the membrane and the subsequent activation of the agent will naturally vary with the particular cross-linking agent being employed. Certain of the above-named agents might be applied, as in vapor form, to the freeze-dried membranes. Generally, it is convenient to apply the cross-linking agent before freeze-drying, especially when the agent is soluble in water.

One example of a suitable cross-linking agent for treating cellulose acetate osmotic membranes is a melamine-formaldehyde condensate. The wet membrane may be easily treated by immersion in a solution of the cross-linking agent although other suitable methods of applying the cross-linking agent, either to the wet membrane or to the freeze-dried membrane, may be employed. A sufficient concentration of the organic agent in the immersion solution is employed to produce the amount of cross-linking desired. When a melamine-formaldehyde condensate is employed, about 4 grams of melamine-formaldehyde are dissolved in 1 liter of distilled water to form a suitable solution for treating a cellulose acetate osmotic membrane.

The wet osmotic membrane is immersed and soaked in the solution for a sufficient time for the membrane to become impregnated with the cross-linking agent solution. With certain cross-linking agents, such as a melamine-formaldehyde condensate, a suitable catalyst is preferably included in the solution in an amount sufficient to accelerate the cross-linking process.

After immersion treatment with the cross-linking solution is completed, the osmotic membrane is freeze-dried as described above. After the water has been removed in the freeze-drying process, the treated membrane is ready to undergo the cross-linking operation. If the membrane is intended to be stored before using, the cross-linking step may be carried out either before the membrane is placed in storage or after it has been removed therefrom. Preferably, cross-linking is completed before storage, because many cross-linking agents have a tendency to polymerize with time. For example, melamine-formaldehyde condensates which are suitable as cross-linking agents may have a storage stability of only about 6 months at ambient temperatures. It should also be appreciated that a separate step may not be necessary to accomplish cross-linking, depending upon the particular organic agent employed. For example, an acid colloid of a melamine-formaldehyde condensate may be used which is activated upon dehydration and thus accomplishes cross-linking at the completion of the freeze-drying step.

The dried, treated osmotic membrane may be heated to a sufficient temperature to cause cross-linking to occur, preferably under conditions which prevent possible physical deformation of the membrane while in such a heated condition. When a melamine-formaldehyde condensate is employed as the cross-linking agent, cross-linking may be carried out at a temperature of about 75° C. in a hot-air oven under atmospheric pressure for a period of about 70 hours, although much shorter times are sufficient to complete the cross-linking step when higher temperatures are employed.

The cross-linking is believed to occur by ether linkage between the methylol groups of the melamine-formaldehyde condensate and the hydroxyl groups of the cellulose acetate between adjacent cellulose chains. Because of the absence of any competing hydroxyls, as would be present if the membrane were still wet with water, the cross-linking proceeds readily. Proof of the effectiveness of the cross-linking is apparent from the insolubility of the cross-linked membrane in organic solvents, such as acetone.

The cross-linked osmotic membranes can be rehydrated in the normal manner described above. Rehydration of the cross-linked membrane serves to remove any residual catalyst, which was added for the cross-linking step, and ready the membrane for use in a separation apparatus. Testing of the rehydrated, cross-linked membrane shows that it has a capacity for rejection of solute substantially equal to that of a membrane made under the same conditions which did not undergo cross-linking treatment. The insolubility of the membrane to organic solvents thus increases the number of applications in which the membrane may be used to include the separation of an organic solvent from a solution of a solute therein. Moreover, cross-linking is considered to increase the dimensional stability, hardness, and softening temperature of the membrane and thereby increase its useful life and performance as a part of a separation apparatus.

The following examples are detailed descriptions of various processes for treating membranes made of cellulosic esters, which processes embody various features of the invention. It should be understood, however, that the following examples in no way limit the scope of the invention which is defined solely by the claims appearing at the end of this specification.

EXAMPLE I

To prepare a casting solution, about 666 parts, by weight, of cellulose acetate are dissolved in about 2,000 parts, by weight, of acetone. The cellulose acetate resin employed contains about 39.8% acetyl, based total weight of the cellulose acetate, the resin thus being primarily in the form of cellulose diacetate. About 33 parts, by weight, of magnesium perchlorate, a swelling agent, are dissolved in about 300 parts, by weight, of water. An equivalent amount of another suitable swelling agent, such as zinc chloride, may alternately be used. The two solutions are mixed, until a homogeneous appearing mixture is obtained, by placing the mixture in a suitable jar and rolling the jar on a jar mill. This final solution is stored at a temperature of about −10° C. until it is used in the membrane-casting operation.

The casting solution is then cast upon a smooth flat surface so that a thin layer of uniform thickness is obtained. The casting operation is regulated so that the thickness of the resultant osmotic membrane is about 100 microns. The cast layer is permitted to remain in contact with the atmosphere for about 1 minute and is then immersed in water maintained at a temperature of about 1° C. The membrane is allowed to remain immersed in the water bath for a sufficient period to set up and to remove any unevaporated acetone by diffusion into the water. Also, the swelling agent is substantially removed. Usually, a few minutes time is sufficient; however, longer or shorter periods may be used if desired. The set-up membrane is then washed thoroughly in tap water. At this point, the membrane is ready for inclusion in separation apparatus wherein rejection of a very high percentage of solute is not required or for further treatment to improve its properties. This washed osmotic membrane is hereinafter referred to as the sample membrane.

A portion of the sample membrane is cut from the overall sample and is blotted with absorbent tissue to remove the extraneous water from its surfaces. The portion is immersed in liquid isopentane at a temperature of about −150° C. After about 5 minutes in liquid isopentane, all the water within the sample membrane portion is changed to ice crystals. The frozen sample is removed and placed in a precooled cryostat vacuum chamber which is maintained at a temperature of about −20° C.

The chamber is rapidly evacuated to a pressure of about $10^{-4}$ mm. of mercury by a vacuum pump. The vacuum pump operates as necessary to maintain the chamber at this pressure. A vapor-removal system, such as a liquid nitrogen trap, is located adjacent the vacuum chamber to effect rapid drying of the frozen membrane. The frozen membrane is maintained in the chamber under this vacuum for about 24 hours. At the conclusion of this period, the chamber is warmed to about 25° C. After about 1 hour at $10^{-4}$ mm. pressure and 25° C. the portion is removed from the drying chamber. This freeze-dried membrane portion may be stored indefinitely exposed to the atmosphere without any significant deterioration of its rejection capabilities.

The thickness of the freeze-dried membrane portion is measured and compared to the thickness of the wet sample membrane. Both of the membrane samples measure 100 microns. A small piece of the freeze-dried membrane portion is analyzed to determine the residual moisture. Analysis shows that, exclusive of any water which is chemically bound to the cellulose acetate, the membrane contains less than about 0.1% water by weight.

A section of the freeze-dried membrane portion is rehydrated by immersion in water at ambient temperature (about 25° C.). After about eight hours in the water, the osmotic membrane is considered to be sufficiently rehydrated and is removed from the water and installed on a separation device of the general type disclosed in the aforementioned U.S. patents. An aqueous 2% solution of sodium chloride (based on weight of water) is applied to the surface of the membrane which surface was exposed to the atmosphere in the casting process (i.e., the surface opposite from that which was against the flat smooth surface). A section of the original sample membrane of the same size is cut from the wet membrane and installed in a similar separation device. Another section is cut, heat-treated by disposition in water at 81° C. for 15 minutes, and then installed in a similar separation device.

The pressure of the sodium chloride solution is increased to about 1,500 p.s.i. and then separation units are run for 48 hours with continuous circulation of the salt solution past the membrane. The output liquid which passes through each membrane is collected, measured and tested. The flow rate of the separation unit with the heat-treated membrane averages about 30 milliliters per hour based upon the membranes which have an effective surface area of about 3 square inches. Testing shows the output liquid to have a sodium chloride content of about 0.045% sodium chloride by weight, based upon weight of water. The flow rate through the nonheat-treated, nonfreeze-dried membrane is about four times as high as the above flow rate, but the percent of salt rejected is only about 70% of that rejected by the heat-treated membrane. This is expected for a membrane which has not been organized by heat-treating. The flow rate through the nonheat-treated freeze-dried membrane is slightly less than that through the heat-treated membrane and the percent of salt rejected is only slightly less. Thus, it is apparent that substantial organization of the membrane occurs during the above freeze-drying process.

Another section of the freeze-dried osmotic membrane portion is stored at ambient temperature and atmospheric pressure conditions for six months. At the conclusion of this storage period, the membrane section is rehydrated and then tested in the manner set forth above. The test results received from this separation unit show that the liquid flow rate and salt concentration of the output liquid are the same as for the freeze-dried membrane reported above. Thus, a membrane section which is freeze-dried and then stored for an indefinite period is considered to be fully the equivalent of a freeze-dried section from the same membrane sample which is rehydrated and tested soon after freeze-drying.

EXAMPLE II

Three sections of the same size and shape are cut from the original membrane sample produced in Example I. Sections A and B are heat-treated to produce membranes which give a higher percentage of solute rejection although a somewhat lower flow rate therethrough. The heat treatment is carried out by immersion in a water bath which is heated to about 80° C. for about 30 minutes.

Section A is transferred to a water bath at ambient temperature and pressure. Sections B and C are blotted to remove any excess water and are then transferred to a commercial freezer which has been precooled to a temperature of about −45° C. The two samples are held in the freezer for about 3 hours, at the end of which period it is felt that all of the water associated with the membrane sections has been changed to ice crystals. At the conclusion of this period, both these sections are transferred to a cryostat vacuum chamber wherein they are subjected to the conditions specified in Example I to cause sublimation of the ice crystals to water vapor.

At the conclusion of this freeze-drying operation, Sections B and C are stored in air at ambient temperature and pressure while Section A is stored in San Diego tap water, which has a pH of about 8.3. After 6 months storage, Sections B and C are rehydrated by immersion in tap water at ambient temperature and pressure for about 8 hours. Section C is transferred to a water bath at about 80° C. and maintained therein for about 30 minutes. At the conclusion of this heat treatment, all three samples are installed in the separation units which were employed to test the membrane sections in Example I.

Input aqueous solutions of 2% NaCl, based upon weight of water, are applied to the separation units. The solution pressures are slowly increased to about 1,500 p.s.i., and circulation flow rates are maintained past the membrane sections which are the same as those employed in Example I. The units are operated for about 48 hours, and the output liquid from each unit is collected, measured and tested. The output from the units employing Sections B and C are found to be similar. Each output measures about 30 ml. per hour for an effective membrane surface area of about 3 square inches. The concentration of NaCl in the output liquid measures about 0.045% by weight of water. The output from the unit employing Section A is over 2 liters per hour, and the concentration of NaCl measures over 1.9%.

Freeze-drying of the membrane sections and storage for indefinite periods, either before or after heat-treating the membranes, is considered to have no deteriorating effect upon the rejection capability of the membranes. As the above test results show, the rejection capability of Section A deteriorates substantially as a result of storage in San Diego tap water for 6 months whereas no significant deterioration occurs in Section B and C which are stored for the 6-month period in a dry state (compared to the heat-treated sample in Example I).

EXAMPLE III

Nine separate sections, labeled Sections D through H and J through M, each measuring two inches by four inches are cut from another length of membrane produced in generally the same manner as that described in Example I. Section D is stored in San Diego tap water until testing. Sections E, F, G and H are heat-treated in accordance with the procedure set forth in Example II. Section E is stored with Section D without further treatment until testing.

A solution of a cross-linking agent is prepared by dissolving about four grams of a melamine-formaldehyde condensate, Aerotex resin M-3, in one liter of distilled water. Magnesium chloride, a catalyst, is added to this aqueous solution in an amount of about 0.64 grams. This cross-linking solution is maintained at ambient temperature and pressure. Sections G to M, inclusive, are immersed in this solution and maintained therein for about a day. At the conclusion of the period, all of these sections are removed from the solution.

The excess water is removed from each of these sections by blotting with absorbent tissue, and all six sections, together with Section F, are then frozen by plunging them into liquid isopentane, at a temperature of about −150° C. After about three minutes in the isopentane bath, all seven sections are removed and are placed in a cryostat vacuum chamber which has been precooled to a temperature of about −60° C. A vacuum is drawn upon the chamber until the pressure therein measures about 1.0 mm. of mercury. The cryostat is maintained at this temperature and pressure for 16 hours. At the end of this period of time, substantially all of the water has been removed from the membrane sections by sublimation, and they are removed from the cryostat. Testing of a small piece of one of the sections shows that the membranes contain less than about 0.1% by weight of water, based weight of total dry membrane.

Sections H, J and K are each placed between a pair of glass plates and transferred to an oven which is heated to a temperature of 75° C. The three sections are left in the oven for 70 hours, which is sufficient time to produce the cross-linking of the melamine-formaldehyde condensate with the hydroxyl groups of the cellulose acetate membrane.

Sections F through M are now stored in the atmosphere at ambient temperature and pressure for three months, while Sections D and E are stored in San Diego tap water. At the conclusion of this storage period, Sections G, L and M are heated to 75° C. for 70 hours in the manner described above to carry out cross-linking. All seven of the dry sections (F, G, H, J, K, L and M) are then rehydrated by immersing them in distilled water for eight hours at ambient temperature and pressure. Then Sections K and M are heat-treated by disposing them in water at about 80° C. for 30 minutes.

Each one of the nine Sections D through H and J through M is then installed in a similar separation unit. The nonheat-treated sections (i.e., Sections D, J and L) are placed in contact with a 2% by weight aqueous sodium chloride solution at a pressure of about 1,500 p.s.i. Solution circulation is maintained as referred to in Example I. The output liquid from each of the units is collected, measured and tested. The output liquid of the units employing Sections J and L measures about 0.06% sodium chloride by weight, showing that about 97% of the NaCl is removed in the separation process. Measurement of the output from these two units over a 24 hour period shows that the membrane constant (membrane constant is defined as the water flow per unit area per unit of time per unit of net pressure, i.e., total applied pressure minus osmotic pressure) for each of the sections is the same, i.e., $0.3 \times 10^{-5}$ grams of liquid/cm.$^2$-sec.-atm. The output liquid from the unit employing the nonfreeze-dried nonheat-treated section (Section D) measures about 1.5% sodium chloride and has a membrane constant of about $3.5 \times 10^{-4}$ g./cm.$^2$-sec.-atm. The results from Section D are considered unsatisfactory for many applications because of the substantial deterioration which occurs during the three month storage period in San Diego tap water. Moreover, even if deterioration does not occur, the results from Sections J and L are substantially above those expected from a nonheat-treated membrane, showing that substantial organization of the membrane occurs during the freeze-drying process.

Each of the other six heat-treated membrane sections (i.e., Sections E, F, G, H, K and M) is installed in a separation unit of the same type and tested using an aqueous solution of about 2% by weight of NaCl. A solution input pressure of 1,500 p.s.i. is employed. The output liquid from each of the units is collected over a 24 hour period and measured and tested. The results of all the units employing freeze-dried membrane sections (i.e., Sections F, G, H, K and M) are substantially equal. The output liquid from each of the units has a content of less than about 0.05% NaCl by weight of water, showing that between about 97.0% and about 97.5% of the NaCl is removed in the separation process. The membrane constants of these membrane sections are similar, about $0.2 \times 10^{-5}$ grams of liquid/cm.$^2$-sec.-atm. to about $0.6 \times 10^{-5}$ grams of liquid/cm.$^2$-sec.-atm. The output liquid from Section E, which was heat-treated but not freeze-dried, measures about 1.0% sodium chloride, and the membrane constant of this section is calculated to be about $4.3 \times 10^{-5}$ g./cm.$^2$-sec.-atm. The deterioration in the rejection capability of this membrane sections renders it unsatisfactory for many applications. Testing of each of the cross-linked sections shows that it is insoluble in acetone.

Consideration of the results of the above tests shows that the cross-linking process does not adversely affect the rejection capability of the cellulose acetate osmotic membranes. The heat-treated cross-linked membranes perform with operating characteristics similar to their non-cross-linked counterparts. Storage of the freeze-dried membranes for three months time at ambient temperature and atmospheric pressure is considered to have no adverse affect upon the membranes. This holds true regardless of whether the cross-linking is carried out before or after storage.

EXAMPLE IV

Three sections of the same size and shape are cut from the membrane sample produced in Example III. Sections N and Q are heat-treated in a water bath which is heated to about 80° C. for about 30 minutes and tested immediately. Testing shows that Section N has a membrane constant of $5.0 \times 10^{-6}$ g./cm.$^2$-sec.-atm. and rejects about 97.5% of the NaCl. Section N is removed from the testing unit and transferred to a bath of San Diego tap water at ambient temperature and pressure.

A solution of a cross-linking agent is now prepared by dissolving 80.7 grams of a melamine-formaldehyde condensate, Aerotex resin M–3, in 82.1 grams of acetic acid and one liter of distilled water to form an acid colloid. This cross-linking solution is aged at about 26° C. and atmospheric pressure for 24 hours. Sections P and Q are immersed in this solution and maintained therein for about a day.

The excess water is removed from both of these sections by blotting with absorbent tissue, and they are then frozen by plunging them into liquid isopentane, at a temperature of about $-150°$ C. After about three minutes in the isopentane bath, the two sections are removed and are placed in a cryostat vacuum chamber which has been pre-cooled to a temperature of about $-45°$. A vacuum is drawn upon the chamber until the pressure therein measures about 0.1 mm. of mercury. The cryostat is maintained at this temperature and pressure for 16 hours. At the end of this period of time, substantially all of the water has been removed from the membrane sections by sublimation, and they are removed from the cryostat. The cross-linking of the acid colloid to the cellulose acetate resin is accomplished simultaneously with the drying of the membrane.

Sections P and Q are now stored in the atmosphere at ambient temperature and pressure for six months, while Section N remains in San Diego tap water. At the conclusion of this storage period, Sections P and Q are rehydrated by immersing them in water for eight hours at ambient temperature and pressure.

Each one of the three Sections N, P and Q is then installed in a similar separation unit. They are placed in contact with a 2% by weight aqueous sodium chloride solution at a pressure of about 1,500 p.s.i., and solution circulation is maintained as in Example I. The output liquid from each of the units is collected, measured and tested. The output liquid from the unit employing Section Q shows that about 97.5% of the NaCl is removed in the separation process, and that the membrane constant is about $5.0 \times 10^{-6}$ grams of liquid/cm.$^2$-sec.-atm.

The output liquid from the unit employing Section N shows that only about 10% of the NaCl is rejected and that the membrane constant is about $3.8 \times 10^{-4}$ g./cm.$^2$-sec.-atm. The output liquid from the unit employing Section R shows that about 97.0% of the NaCl is removed in the separation process and that the membrane constant is about $0.4 \times 10^{-5}$ grams of liquid/cm.$^2$-sec.-atm.

Consideration of the results of the above tests show that the cross-linking process does not adversely affect the rejection capability of the cellulose acetate osmotic membrane. Testing of the cross-linked membranes shows that they are insoluble in acetone.

EXAMPLE V

Three additional sections, labeled Sections R, S and T, each measuring two inches by four inches, are cut from the sample membrane produced in Example III. The entire procedure described in Example IV is repeated, except that a different cross-linking agent is used and cross-linking is effected by heating. Sections R and T are heat-treated for 30 minutes in water at 80° C.

A 10% solids aqueous solution of a cross-linking agent, a strongly cationic synthetic resin, Kymene 557, a cationic water-soluble polymer with a nitrogen content of 12.8 percent (dry basis) . . . (Trademark of Hercules Incorporated), is used. This cross-linking solution is maintained at ambient temperature and pressure, and Sections S and T are immersed in this solution and maintained therein for about two hours.

The excess water is removed from these two sections by blotting with absorbent tissue, and they are freeze-dried under the conditions set forth in Example IV. The freeze-dried membranes are heated in an air oven at 75° C. for 70 hours to effect cross-linking.

Testing shows that Sections R, S and T reject 10%, 97% and 97.5% of the NaCl, respectively. The membrane constants measure $38.0 \times 10^{-5}$, $0.3 \times 10^{-5}$, and $0.5 \times 10^{-5}$ (g./cm.$^2$-sec.-atm.) respectively. The cross-linked sections are insoluble in acetone. The conclusions are the same as those which are set forth with respect to Example IV.

EXAMPLE VI

Three more sections, labeled Sections U, V and W, each measuring two inches by four inches, are cut from the sample membrane produced in Example III. The procedure described in Example IV is repeated except that a different cross-linking agent is used. Only Section U is heat-treated initially.

A solution of a cross-linking agent is now prepared by dissolving 41.7 grams of dimethylolurea (urea-formaldehyde) in a liter of distilled water. Aluminum nitrate, a catalyst, is added to this aqueous solution in an amount of 0.4% by weight of the total solution. This cross-linking solution is maintained at 55° C. and atmospheric pressure. Sections V and W are immersed in this solution and maintained therein for about 1 hour.

The excess water is removed from these two sections by blotting, and then they are freeze-dried as set forth in Example IV. Dehydration of the membrane sections effects cross-linking. After the six-month storage period and rehydration of the membranes, Section W is heat-treated for 30 minutes in water at 80° C.

Testing shows that Sections U, V and W, respectively, reject about 10%, 97% and 97% of the NaCl. The respective membrane constants are $38.0 \times 10^{-5}$, $0.35 \times 10^{-5}$, and $0.4 \times 10^{-5}$ (g./cm.$^2$-sec.-atm.). The cross-linked sections are insoluble in acetone. The conclusions are the same as those set forth with respect to Example IV, except that it appears that once the membrane structure is organized by freeze-drying, subsequent heat-treatment at 80° C. has little effect.

Freeze-drying of the membranes and storage of the freeze-dried membranes for an indefinite period is believed to have no deteriorating effect upon the membranes so that when these membranes are rehydrated, they maintain their prospective operational life expectancy. Furthermore, freeze-drying is considered to provide substantial organization of the membrane and may thus eliminate the necessity of heat-treating membranes for many applications.

The cross-linking of the cellulose ester membranes renders the cellulose acetate insoluble in various organic solvents, thus increasing the prospective field of use of these osmotic membranes.

Although the invention has been described with reference to certain specific examples and materials, it should be understood that these do not constitute limitations upon the scope of the invention and that modifications which would be obvious to one skilled in the art are to be considered as coming within the scope of this invention.

Various of the features of the invention are set forth in the following claims.

What is claimed is:

1. In a process which includes casting a thin layer of an organic solution of a film-forming material selected from the group consisting of cellulose acetate, cellulose nitrate and ethyl cellulose and a swelling agent and immersing said cast layer in water to complete the formation of an osmotic membrane, the improvement which comprises treating said formed osmotic membrane with a sufficient amount of an organic cross-linking agent which is effective to cross-link said cellulose to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof, and cross-linking the cellulose with said organic cross-linking agent.

2. In a process which includes casting a thin layer of an organic solution of a film-forming material selected from the group consisting of cellulose acetate, cellulose nitrate and ethyl cellulose, and a swelling agent, immersing said cast layer in water to complete the formation of an osmotic membrane, the improvement which comprises treating said formed osmotic membrane with a sufficient amount of an aqueous solution of a melamine-formaldehyde condensate which is effective to cross-link said cellulose to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof, and heating said dried osmotic membrane to cross-link the cellulose.

3. In a process which includes casting a thin layer of an organic solution of a film-forming material selected from the group consisting of cellulose acetate, cellulose nitrate and ethyl cellulose, and a swelling agent, immersing said cast layer in water to complete the formation of an osmotic membrane, the improvement which comprises treating said formed osmotic membrane with a sufficient amount of an aqueous solution of an acid colloid of a melamine-formaldehyde condensate which is effective to cross-link said cellulose to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof and cross-linking the cellulose.

4. In a process which includes casting a thin layer of an organic solution of a film-forming cellulose acetate and a swelling agent, and immersing said cast layer in water to complete the formation of a cellulose acetate osmotic membrane, the improvement which comprises treating said formed cellulose acetate osmotic membrane with a sufficient amount of an organic cross-linking agent which is effective to cross-link said cellulose acetate to render said osmotic membrane insoluble in acetone upon cross-linking and freezing said osmotic membrane to change the water associated therewith to crytals of ice, subjecting said frozen membrane to vacuum conditions at a temperature below freezing point of water to cause the removal of substantially all of said ice by sublimation, thereby improving the solute rejection capability thereof, and cross-linking the cellulose acetate with said organic cross-linking agent.

5. The invention in accordance with claim 4 wherein said freezing is carried out by immersion in liquid isopentane.

6. In a process which includes casting a thin layer of an organic solution of a film-forming cellulose acetate and a swelling agent, and immersing said cast layer in water to complete the formation of a cellulose acetate osmotic membrane, the improvement which comprises treating said formed cellulose acetate osmotic membrane with a sufficient amount of an aqueous solution of a melamine-formaldehyde condensate which is effective to cross-link said cellulose acetate to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof, and heating said dried osmotic membrane to cross-link the cellulose acetate.

7. The invention in accordance with claim 6 wherein said freezing is carried out by immersion in liquid isopentane.

8. In a process which includes casting a thin layer of an organic solution of a film-forming cellulose acetate and a swelling agent, and immersing said cast layer in water to complete the formation of a cellulose acetate osmotic membrane, the improvement which comprises treating said formed cellulose acetate osmotic membrane with a sufficient amount of an aqueous solution of an acid colloid of a melamine-formaldehyde condensate which is effective to cross-link said cellulose acetate to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof and cross-linking the cellulose acetate.

9. The invention in accordance with claim 8 wherein said freezing is carried out by immersion in liquid isopentane.

10. In a process which includes casting a thin layer of an organic solution of a film-forming cellulose acetate and a swelling agent, and immersing said cast layer in water to complete the formation of a cellulose acetate osmotic membrane, the improvement which comprises treating said formed cellulose acetate osmotic membrane with a sufficient amount of an aqueous solution of dimethylolurea which is effective to cross-link said cellulose acetate to render said osmotic membrane insoluble in acetone upon cross-linking and freezing said osmotic membrane to change the water associated therewith to crystals of ice, subjecting said frozen membrane to vacuum conditions at a temperature below freezing point of water to cause the removal of substantially all of said ice by sublimation thereby improving the solute rejection capability thereof and cross-linking said cellulose acetate osmotic membrane with said dimethylolurea.

11. In a process which includes casting a thin layer of an organic solution of a film-forming cellulose acetate and a swelling agent, and immersing said cast layer in water to complete the formation of a cellulose acetate osmotic membrane, the improvement which comprises immersing said formed cellulose acetate osmotic membrane in an aqueous solution of at least about 4 grams of a melamine-formaldehyde condensate, which is effective to cross-link said cellulose acetate to render said osmotic membrane insoluble in acetone upon cross-linking, and at least about 0.6 grams of magnesium chloride per liter of water, freezing said osmotic membrane to change the water associated therewith to crystals of ice, subjecting said frozen membrane to vacuum conditions at a temperature below freezing point of water to cause the removal of substantially all of said ice by sublimation and thereby improving the solute rejection capability thereof, and cross-linking the cellulose acetate by heating the dried membrane.

12. In a process which includes casting a thin layer of an organic solution of a film-forming cellulose acetate and a swelling agent, and immersing said cast layer in water to complete the formation of a cellulose acetate osmotic membrane, the improvement which comprises immersing said formed cellulose acetate osmotic membrane in an aqueous solution of an acid colloid of a melamine-formaldehyde condensate which is effective to cross-link said cellulose acetate to render said osmotic membrane insoluble in acetone upon cross-linking, which solution contains about 80.7 grams of said condensate and about 82.1 grams of acetic acid per liter, freezing said osmotic membrane to change the water associated therewith to crystals of ice, subjecting said frozen membrane to vacuum conditions at a temperature below freezing point of water to cause the removal of substantially all of said ice by sublimation, thereby improving the solute rejection capability thereof and cross-linking the cellulose acetate.

References Cited

UNITED STATES PATENTS

| 2,444,124 | 1/1948 | Wedler | 34—5 |
| 2,956,895 | 10/1960 | Salo et al. | 260—15 |
| 3,133,132 | 5/1964 | Loeb et al. | 264—49 |
| 3,168,421 | 2/1965 | Beaver et al. | 260—232 |

OTHER REFERENCES

Chem. Abstract, 55:5925i, Jacobs, "Preparation of Dry Nitrocellulose Membranes and Nitrocellulose Particles."

WILLIAM H. SHORT, *Primary Examiner.*

E. M. WOODBERRY, *Assistant Examiner.*

U.S. Cl. X.R.

34—5; 136—142; 106—169, 193, 196, 197; 260—232, 230